US006684788B2

(12) United States Patent
Ohno et al.

(10) Patent No.: US 6,684,788 B2
(45) Date of Patent: Feb. 3, 2004

(54) ROTARY PRESS CONTROL APPARATUS AND METHOD CAPABLE OF CONTROLLING OPERATION IN A POWER FAILURE

(75) Inventors: Kinichiroh Ohno, Machida (JP); Ryoji Kaneko, Kawasaki (JP)

(73) Assignee: Tokyo Kikai Seisakusho, Ltd., Tokyo (JP)

(*) Notice: Subject to any disclaimer, the term of this patent is extended or adjusted under 35 U.S.C. 154(b) by 0 days.

(21) Appl. No.: 10/104,770

(22) Filed: Mar. 21, 2002

(65) Prior Publication Data

US 2002/0189480 A1 Dec. 19, 2002

(30) Foreign Application Priority Data

Jun. 13, 2001 (JP) ....................................... 2001-177895

(51) Int. Cl.$^{7}$ ............................ B41F 33/00; H02P 5/28; G05B 19/18

(52) U.S. Cl. ............................ 101/484; 318/700; 700/3

(58) Field of Search ................................ 101/483, 484, 101/216, 248, 181, 219, 221, 485, 183, 136, 141, 152, 153, 173, 174, 180, 212; 318/34, 41, 700, 567, 85, 615, 611, 625, 640, 671; 700/3, 8

(56) References Cited

U.S. PATENT DOCUMENTS

| | | | | | |
|---|---|---|---|---|---|
| 5,196,769 | A | * | 3/1993 | Chiba et al. | 318/39 |
| 5,757,147 | A | * | 5/1998 | Blumor et al. | 318/41 |
| 6,109,176 | A | * | 8/2000 | Fujio et al. | 101/216 |
| 6,417,643 | B1 | * | 7/2002 | Shiba et al. | 318/700 |
| 2002/0144609 | A1 | * | 10/2002 | Tokiwa | 100/155 R |

FOREIGN PATENT DOCUMENTS

| | | |
|---|---|---|
| EP | 0 537 344 A1 | 4/1993 |
| EP | 0 747 214 A2 | 12/1996 |
| JP | 60-36946 | 8/1985 |
| JP | 3-89895 | 4/1991 |
| JP | 03-089895 | 4/1991 |
| JP | 11-129437 | 5/1999 |
| JP | 3037650 | 2/2000 |
| JP | 3059081 | 4/2000 |

* cited by examiner

*Primary Examiner*—Andrew H. Hirshfeld
*Assistant Examiner*—Hoai-An D. Nguyen
(74) *Attorney, Agent, or Firm*—McGlew and Tuttle, P.C.

(57) ABSTRACT

The present invention controls a rotary press comprising printing and folding sections each having at least one electric motor so as to be driven individually; the rotary press operated in a synchronized manner by the motors in such a manner that the rotary press can be decelerated and stopped at least in a synchronized state in the event of a power failure while stabilizing the voltage of the power fed to each of the inverters from the power failure power feeding section to a voltage level instructed by the power failure basic voltage command signal, storing the power generated by the inertial rotation of the motors and feeding power to the inverters.

2 Claims, 4 Drawing Sheets

ROTARY PRESS CONTROL APPARATUS AND METHOD CAPABLE OF CONTROLLING OPERATION IN A POWER FAILURE

CROSS-REFERENCE TO RELATED APPLICATIONS

This application claims priority from Japanese patent application Serial no. 2001-177895 filed Jun. 13, 2001, the contents of which are incorporated by reference herein.

BACKGROUND OF THE INVENTION

1. Field of the Invention

The present invention relates generally to a control system for a rotary press, and more particularly to a control system for the so-called shaft-less rotary press that carries out printing operation by separately driving the driven components thereof, such as a printing section and a folding section, with independent motors; the control system capable of decelerating the driven components at least in synchronization with each other, and stopping them in the event of a main power failure.

2. Description of the Related Art

Conventional rotary presses, such as disclosed in Japanese Published Examined Patent Application No. Sho-60 (1985)-36946, employ an integrated drive source comprising a plurality of main motors provided on a printing section, a folding section and other components of the rotary press connected to each other via a main shaft and a clutch to drive the entire rotary press system.

In recent years, on the other hand, the so-called shaft-less rotary press has become widely used due to various advantages in printing operation. In the shaft-less rotary press, a plurality of motors separately drive different driven components, with electrical synchronous control maintained so that the rotational speed and phase of the motors and the driven components can be properly matched with each other, as disclosed in Japanese Patent Publication Nos. 3037650 and 3059081.

With the shaft-less rotary press, however, the motors and the driven components tend to keep rotating by reason of inertia in case power feeding is interrupted due to a main supply failure during printing. This could lead not only to improper printing results but also to uneven tension on the paper web traveling in the rotary press, resulting in the breakage of the web or the clinging of the web around the rotary parts in extreme cases.

Restoration of the rotary press to the normal printing state, such as removal of the paper clung to the rotary parts, or rethreading of the web to the normal travel path, would take much time, preventing printing operation from being immediately resumed even after power supply has been returned to normal. This has been a big problem to be solved especially in newspaper printing and other printing operations requiring quick and timely printing.

As a measure to solve this problem, the shaft-less rotary press disclosed in Japanese Patent Publication No. 3037650 employs a construction where driven components are individually braked to stop the rotary press in case power feeding is interrupted due to a main power failure.

This rotary press control method, however, tends to have differences in the inertial forces that cause the driven components to keep rolling even after power feeding has been interrupted, and there are no small differences in braking forces to put brake on the rotation caused by the inertial forces. In addition, there is some time lag in the timing at which braking is started in each braking section. All these factors have caused variability in the time required for the rotating speed of each driven component to begin decreasing due to braking as well as in the time required for each driven component to come to a halt. For this reason, even this type of rotary press could not avoid uneven tensions on the traveling paper web in the rotary press that could lead to the breakage of the web or the clinging of the web around the rotary parts.

SUMMARY OF THE INVENTION

The present invention is intended to overcome the aforementioned problems, and it is therefore an object of the present invention to provide a rotary press control system, specifically for electrically synchronous-controlled shaft-less rotary presses, that is capable of control in the event of a power failure by preventing uneven tensions from exerting on a continuous paper web that travels in the rotary press, thereby preventing the paper web from breaking or sticking to the rotary parts, so that printing operation can be resumed immediately after the main power is restored.

The present invention provides a rotary press control apparatus capable of controlling, in the event of a power failure, the operation of a rotary press comprising at least one unit each of printing and folding sections; each of the printing and folding sections having at least one electric motor so as to be driven individually, the rotary press operated in a synchronized manner by the motors; the apparatus comprising: an inverter provided on each motor for controlling the rotation of the motor; a basic command output section that can be operated even in a power failure for outputting a normal operation basic speed command signal during normal operation, and a power failure basic speed command signal and a power failure basic voltage command signal for specifying the voltage of power fed to the inverter in the event of a power failure; a power failure detecting section for detecting a power failure and outputting a power failure signal; a power failure power feeding section for storing the power generated by the inertial rotation of the motors during a power failure where the power failure detecting section detects the power failure and feeding power to each of the inverters; and a control command output section that can be operated even in a power failure for outputting a normal operation control speed command signal in accordance with the normal operation basic speed command signal during normal operation, and in the event of a power failure where the power failure detecting section detects the power failure, comparing the power failure basic voltage command signal with an output voltage detection signal of the power failure power feeding section, and generating a power failure control speed command signal for output by correcting the power failure basic speed command signal in accordance with the comparison results, so that the rotary press can be decelerated and stopped at least in a synchronized state in the event of a power failure while stabilizing the voltage of the power fed to each of the inverters from the power failure power feeding section to a voltage level instructed by the power failure basic voltage command signal.

The present invention provides a rotary press control method capable of controlling, in the event of a power failure, the operation of a rotary press comprising at least one unit each of printing and folding sections; each of the printing and folding sections having at least one electric motor so as to be driven individually, and an inverter provided on each motor for controlling the rotation of the motor; the rotary press operated in a synchronized manner by the motors, the method comprising: a basic command output process that can be operated even in a power failure for outputting a normal operation basic speed command signal during normal operation, and a power failure basic speed command signal and a power failure basic voltage command signal for specifying the voltage of power fed to the inverter in the event of a power failure; a power failure detecting process for detecting a power failure and outputting a power failure signal; a power failure power feeding process for storing the power generated by the inertial rotation of the motors during a power failure where the power failure detecting process detects the power failure and feeding power to each of the inverters; and a control command output process that can be operated even in a power failure for outputting a normal operation control speed command signal in accordance with the normal operation basic speed command signal during normal operation, and in the event of a power failure where the power failure detecting process detects the power failure, comparing the power failure basic voltage command signal with an output voltage detection signal of the power failure power feeding process, and generating a power failure control speed command signal for output by correcting the power failure basic speed command signal in accordance with the comparison results, so that the rotary press can be decelerated and stopped at least in a synchronized state in the event of a power failure while stabilizing the voltage of the power fed to each of the inverters from the power failure power feeding process to a voltage level instructed by the power failure basic voltage command signal.

According to the present invention, the rotary press is controlled through the following operations.

In normal operation, electric power from a power supply is supplied to each motor after converted via the inverter serving the motor into an appropriate frequency to cause the motor to operate in accordance with the normal operation control speed command signal, and an appropriate power is also supplied via another path from the same power supply, or from another power supply, to the basic command output section and the control command output section.

The basic command output section outputs normal operation basic speed command signals on the basis of an instruction of a signal or a sequential signal given by manual operation via appropriate means in a state where power is supplied. The normal operation basic speed command signal thus generated is processed via the control command output section into a normal operation control speed command signal for output to the inverters.

Each inverter converts the power supplied from the power supply into an appropriate frequency to cause the motor which it controls to operate at an instructed speed specified by the input normal operation control basic speed command signal and output to the motor which the inverter controls in accordance with a predetermined processing for each inverter, so that the rotary press can operate at an operating speed specified by the input normal operation control speed command signal.

Each motor is rotated by the power of an appropriate frequency supplied via the corresponding inverter to drive each driven component.

In normal operating state, in case the power voltage drops due to a main power supply failure, a power failure detecting section detects it and outputs a power failure signal. As the power failure temporarily interrupts power feeding to the motor via the inverter, the motor begins inertial rotation, together with the driven component. Then, the emergency power supply begins supplying uniform power to each inverter, which in turn converts the uniform power into an appropriate frequency to cause the motor to operate in response to the power failure control speed command signal and supplies the power to the motor, and the power generated by the motor that keeps on inertial rotation is stored in the power failure power feeding section.

The power failure signal output by the power failure detecting section is fed to the basic command output section and the control command output section, both operable even during a power failure. Upon receipt of the power failure signal, the basic command output section changes the normal operation basic speed command signal that it has been outputting to a power failure basic speed command signal for output, and also outputs a new power failure basic voltage command signal. The power failure basic speed command signal instructs the rotary press to stop its operation after a predetermined deceleration process. Both the power failure basic speed command signal and the power failure basic voltage command signal output by the basic command output section are fed to the control command output section.

Both the power failure basic speed command signal and the power failure basic voltage command signal output by the basic command output section are correlated with each other for subsequent processing by the input power failure signal in the control command output section, which in turn processes both the power failure basic speed command signal and the power failure basic voltage command signal by correlating them with each other and generates a power failure control speed command signal for output to the inverters.

Each inverter converts the power fed from the power failure power feeding section into an appropriate frequency to cause the motor it serves to operate at a command speed given by the input power failure control speed command signal for output to the motor it controls in accordance with a predetermined processing procedures for each inverter, so that the rotary press can operate at an operating speed instructed by the input power failure control speed command signal, as in normal operation.

Each motor rotates in accordance with the power of an appropriate frequency to cause the motor to operate fed by the corresponding inverter. That is, when the inertial rotation of the motor is higher than the rotation in accordance with the frequency of the power fed by the inverter, the rotation of the motor is controlled by regenerative braking so as to match with the rotation in accordance with the frequency of the power fed by the inverter. When the inertial rotation of the motor is lower than the rotation in accordance with the frequency of the power fed by the inverter, on the other hand, the rotation of the motor is controlled so as to match with the rotation in accordance with the frequency of the power fed by the inverter. In either case, the motor decelerates and brings to a halt the driven component thereof in synchronization.

In this power failure control mode, the voltage of the power fed to the motor via the inverter is maintained at a stabilized state since the power failure control speed command signal is generated by correcting the power failure basic speed command signal on the basis of the power failure basic voltage command signal.

DETAILED DESCRIPTION OF THE PREFERRED EMBODIMENTS

Now, embodiments of the present invention will be described, referring to the accompanying drawings.

Figure 1:
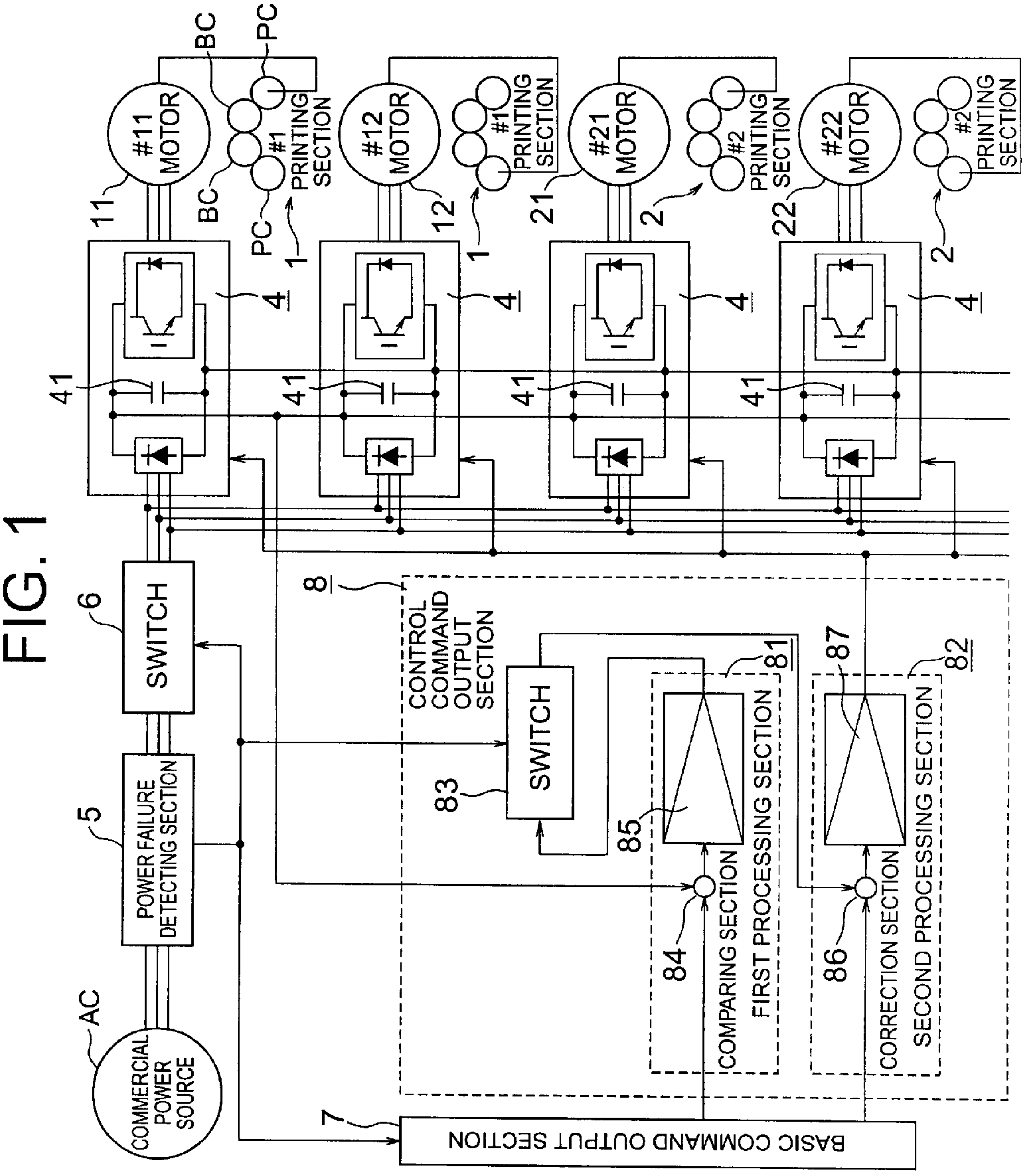
FIG. 1 is a diagram illustrating the partial configuration of an embodiment of the present invention.
Figure 2:
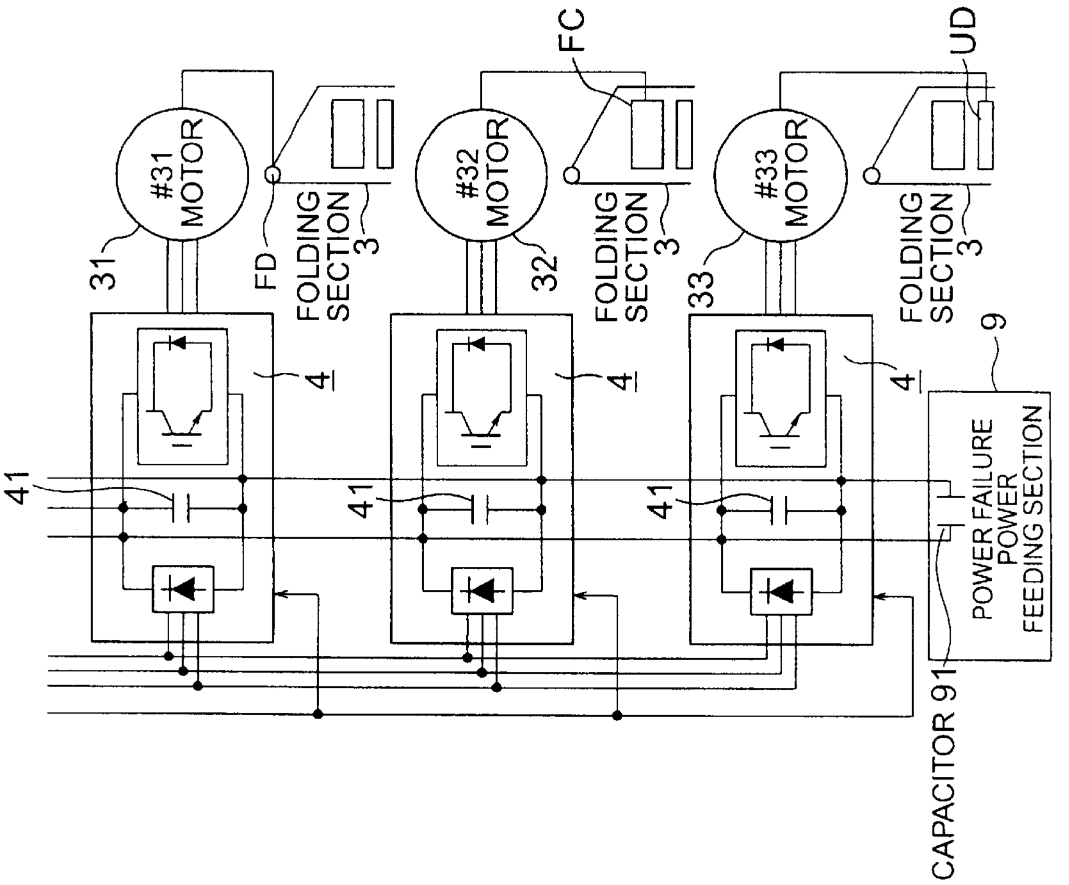
FIG. 2 is a diagram illustrating the partial configuration of an embodiment of the present invention, with the left end thereof connected to the right end of FIG. 1 to constitute the entire configuration.

FIG. 1 is a diagram illustrating the partial configuration of an embodiment of the present invention. FIG. 2 is a diagram illustrating the partial configuration of an embodiment of the present invention, with the left end thereof connected to the right end of FIG 1 to constitute the entire configuration.

In FIGS. 1 and 2, the configuration of a rotary press in which two driven components in #1 printing section are driven by #11 motor 11 and #12 motor 12, two driven components in #2 printing section by #21 motor 21 and #22 motor 22, and three driven components in a folding section 3 by #31 motor 31, #32 motor 32 and #33 motor 33 will be described in the following.

Each of the printing sections 1 and 2 comprises two sets of printing couples as driven components comprising a blanket cylinder BC and a plate cylinder PC; each printing couple individually driven by motors 11 and 12, or 21 and 22, directly or via transmission means (not shown).

The folding section 3 comprises a folding mechanism FC and an above-former drag roller FD and under-folder drag roller UD, both being driven components each individually driven by motors 31, 32 or 33 directly or via transmission means (not shown).

In the embodiment shown in FIGS. 1 and 2, the motors 11, 12, 21, 22, 31, 32 and 33 are connected to a commercial power source AC via the inverters 4 each provided to serve each of the motors. A power failure detecting section 5 for detecting a voltage drop in the commercial power source AC and outputting a power failure signal is provided between the commercial power source AC and each inverter 4, and a switch 6 that turns off upon receipt of the power failure signal is provided between the power failure detecting section 5 and each inverter 4.

The inverters 4, 4, - - - are connected in parallel to the commercial power source AC, and also connected in parallel to a basic command output section 7 via a control command output section 8, which will be described later, so as to receive a normal operation control speed command signal output by the control command output section 8 on the basis of a normal operation basic speed command signal output by the basic command output section 7, or a power failure control speed command signal output by the control command output section 8 on the basis of a power failure basic speed command signal output by the basic command output section 7.

Furthermore, the inverters 4, 4, - - - are connected in parallel to capacitors 41, 41, - - - that are built therein, and a capacitor 91 having a far larger capacity than the capacitors 41, 41, - - - is connected in parallel to the capacitors 41, 41, - - - . This capacitor 91 is a storage section that is a power failure power feeding section 9 for feeding uniform power to the inverters 4, 4, - - - in the event of a power failure.

The basic command output section 7 is connected to the commercial power source AC shown in the figure via another path, or to another commercial power source of a difference system, and at the same time, has an uninterruptible power supply, for example. This uninterruptible power supply is actuated with a detection signal output by a power failure detector incorporated in the uninterruptible power supply. As a result, the basic command output section 7 can maintain its function of outputting basic command signals for a predetermined length of time even in the event of a power failure. The basic command output section 7 can switch over signals output by itself upon receipt of a detection signal output by the power failure detector of the uninterruptible power supply, or a power failure signal output by the aforementioned power failure detecting section 5.

That is, when the commercial power source AC is in normal state, the basic command output section 7 outputs a normal operation basic speed command signal for instructing the rotary press to execute an operation in accordance with a start, acceleration/deceleration, constant speed operation or stop signal given by the manual operation of the operating switch of the rotary press, or in accordance with a sequential signal involving start, acceleration/deceleration, constant speed operation or stop output by this manual operation.

In case the commercial power source AC fails, the uninterruptible power supply of the basic command output section 7 is actuated to maintain the operating state thereof, and the basic command output section 7 outputs a power failure basic speed command signal for instructing the rotary press to stop its operation after a predetermined deceleration process, in place of the normal basic speed command signal, and outputs a power failure basic voltage signal for instructing the rotary press to keep the voltage fed to the inverters 4, 4, - - - at a constant level.

The control command output section 8 is connected to the commercial power source AC shown in the figure via another path, or to another commercial power source of a different system, and has an interruptible power supply, as in the case of the aforementioned basic command output section 7. The uninterruptible power supply is actuated with a detection signal from a power failure detector incorporated in the uninterruptible power supply. As a result, the control command output section 8 can maintain its function of outputting control command signals for a predetermined length of time even in the event of a power failure.

The control command output section 8 generates and outputs a normal operation control speed command signal on the basis of the aforementioned normal operation basic speed command signal, and also generates and outputs a power failure control speed command signal on the basis of the aforementioned power failure basic speed command signal.

That, is, the control command output section 8 has a first processing section 81 for generating a correction signal in accordance with a change in the voltage of the power fed to the inverters 4, 4, - - - , and a second processing section 82 for correcting the basic speed command signal to an appropriate control speed command signal on the basis of the correction signal and outputting the corrected control speed command signal. A switch 83 that is normally in "OFF" state and turns "ON" upon receipt of a power failure signal output by the aforementioned power failure detecting section 5 is provided between the first and second processing sections 81 and 82.

The first processing section 81 comprises a comparing section 84 for comparing a detection signal of the voltage of the power fed to the inverters 4, 4, - - - with the power failure basic voltage command signal output by the basic command output section 7, and a correction signal output section 85 for outputting a correction signal corrected on the basis of the comparison results. The second processing section 82 comprises a correction section 86 for correcting the basic speed command signal output by the basic command output section 8 with the aforementioned correction signal, and a control signal output section 87 for outputting a control speed command signal on the basis of the correction results.

In the meantime, it is apparent from the foregoing description that the first processing section 81 generates a correction signal, which is input into the correcting section 86 of the second processing section 82 only in a power failure when the switch 83 is turned "ON." For this reason, the power failure basic speed command signal is corrected with a correction signal in the second processing section 82, and the control signal output section 87 outputs a power failure control speed command signal on the basis of it.

Note that whereas the normal operation basic speed command signal goes through the correcting section 86 of the second processing section 82, the normal operation basic speed command signal is not corrected during normal operation where no correction signal is input into the correcting section 86. The control signal output section 87 therefore outputs the normal operation control speed command signal on the basis of the normal operation basic speed command signal.

The operation of an embodiment of the present invention having the aforementioned configuration will be described in the following.

In normal operation when the commercial power source AC is in normal state, the basic command output section 7 outputs a normal operation basic speed command signal in accordance with an operating signal given by the manual operation of the operating switch of the rotary press, for example. This normal operation basic speed command signal goes through the correcting section 86 and the control signal output section 87 of the second processing section 82, and is output from the control signal output section 8 as a normal operation control speed command signal. The normal operation control speed command signal output by the control signal output section 87 is input into the inverters 4, 4, - - - each provided for each of the motors 11, 12, 21, 22, 31, 32 and 33.

The inverters 4, 4, - - - , into which the normal operation control speed command signal is input, upon receipt of a 3-phase a-c power from the commercial power source AC, converts inside thereof the 3-phase a-c power into a d-c power, which is processed in accordance with the aforementioned control speed command signal with a processing predetermined for each inverter 4. Each of the inverters 4, 4, - - - then converts this d-c power into a 3-phase a-c power of an appropriate frequency to cause the motor 11, 12, 21, 22, 31, 32, or 33 controlled by each of the inverters 4, 4, - - - to rotate at an operating speed corresponding to a command on the basis of the aforementioned normal operation control speed command signal so as to cause the motor 11, 12, 21, 22, 31, 32, or 33 to rotate in accordance with the normal operation control speed command signal on the basis of the normal operation basic speed command signal. By doing this, the rotary press operates in accordance with the operating signal.

Needless to say, synchronous control is accomplished by providing a known synchronous control section (not shown), outputting a basic phase command signal from the basic command output section 7, feeding back the rotational phase of the motors 11, 12, 21, 22, 31, 32, and 33 with a rotary encoder, for example, and comparing the rotation phase of the motors 11, 12, 21, 22, 31, 32 and 33 with the phase instructed by the basic phase command signal, and matching the rotational phases of the driven components on the basis of the processing results.

Since synchronous control is not necessarily required for the control of rotary press in a power failure that is a feature of the present invention, and it is not directly related to the present invention, description of the synchronous control has been omitted. Needless to say, synchronous control can be carried out even in the control of rotary press in a power failure.

When the voltage of the commercial power source AC drops due to a power failure in the normal operating state of the rotary press, the power failure detecting section 5 detects it and outputs a power failure signal. This power failure signal is input into a switch 6 provided between the power failure detecting section 5 and the inverters 4, 4, - - - , the basic command output section 7 and the switch 83 of the control command output section 8.

In a power failure, power feeding to the motors 11, 12, 21, 22, 31, 32 and 33 via the inverters 4, 4, - - - from the commercial power source AC is temporarily interrupted, and the motors 11, 12, 21, 22, 31, 32 and 33 begin inertial rotation, together with the driven components thereof.

Upon receipt of a power failure signal, on the other hand, the switch 6 is turned "OFF," breaking the connection between the commercial power source AC and the inverters 4, 4, As the connection to the commercial power source AC has been broken, the d-c power stored in the capacitors 41, 41, - - - connected in parallel to the inverters 4, 4, - - - and the power failure power feeding section 9 comprising a large-capacity capacitor 91 by converting the power fed by the commercial power source AC into a d-c power during normal operation is fed uniformly to the inverters 4, 4, - - - . In the power failure power feeding section 9 also stored is the power generated by the inertial rotation of the motors 11, 12, 21, 22, 31, 32 and 33.

The basic command output section 7 maintains its basic command signal outputting function by the aid of the aforementioned uninterruptible power supply that is actuated simultaneously with the power failure, and upon receipt of a power failure signal, changes the normal operation basic speed command signal that it has so far been outputting to a power failure basic speed command signal for instructing the rotary press to decelerate and stop its operation, and outputs a new power failure basic voltage command signal. Both the power failure basic speed command signal and the power failure basic voltage command signal are input into the control command output section 8.

The switch 83 of the control command output section 8 is turned "ON" by the power failure signal. The first and second processing sections 81 and 82 maintain their functions by the aid of the aforementioned uninterruptible power supply that has been actuated by the power failure, and output a power failure basic speed command signal. That is, the first processing section 81 compares the power failure basic voltage command signal output by the basic command output section 7 with the detection signal of the voltage of the d-c power fed from the power failure power feeding section 9 to the inverters 4, 4, - - - in the comparing section 84 thereof to obtain the difference between both, and the correction signal output section 85 generates and outputs a correction signal on the basis of this difference.

The correction signal output by the first processing section 81 is input into the correcting section 86 of the second processing section 82 via the switch 83. The power failure basic speed command signal output by the basic command output section 7 is input into the correcting section 86 of the second processing section 82, in addition to the aforementioned correction signal, and is corrected with the correction signal in the correcting section 86. The control signal output section 87 generates and outputs a power failure control speed command signal on the basis of the corrected power failure basic speed command signal. The power failure control speed command signal output by the control signal output section 87 of the second processing section 82 is input into the inverters 4, 4, - - - .

The inverters 4, 4, - - - into which the power failure control speed command signal is input convert, in accordance with a predetermined processing for each inverter 4, the d-c power supplied from the power failure power feeding section 9 into a 3-phase a-c power of a frequency to cause the motor 11, 12, 21, 22, 31, 32 or 33 each inverter 4 controls to operate in such a manner to stop rotation after a deceleration process instructed by the aforementioned power failure control speed command signal, and output the converted power so that the motor 11, 12, 21, 22, 31, 32 or 33 each inverter 4 controls is decelerated and stopped in a synchronized manner.

In the rotational control of the motors 11, 12, 21, 22, 31, 32 and 33 by the inverters 4, 4, - - - on the basis of the power failure control speed command signal using the power failure power feeding section 9 as a power source, the motor 32 driving the folding mechanism of the folding section 3, for example, tends to decelerate faster than the other motors 11, 12, 21, 22, 31 and 33 due to differences in loads exerted by the driven components onto the motors 11, 12, 21, 22, 31, 32 and 33.

For this reason, the power failure control speed command signal instructs the motors 11, 12, 21, 22, 31, 32 and 33 to decelerate and stop rotation in the same manner.

With this command, the motor 11, 12, 21, 22, 31 or 33 works as a generator, and the generated power and the power from the power failure power feeding section 9 are consumed to drive the motor 32 in such a manner as to rotate in accordance with the power failure control speed command signal.

As a result, the motor 11, 12, 21, 22, 31 or 33 is regeneratively braked. The surplus of the generated power is stored in the power failure power feeding section 9.

As consumption of the power in the power failure power feeding section 9 proceeds to such an extent that the voltage of the d-c power fed from the power failure power feeding section 9 becomes lower than that instructed by the power failure basic voltage command signal, the first and second processing sections 81 and 82 collaborate to correct the power failure control speed command signal into a signal to decelerate faster than the power failure basic speed command signal. With this, the rotation of all or some of the motors 11, 12, 21, 22, 31, 32 and 33 that tend to keep inertial rotation at the control speed thus far exceeds the rotational speed caused by the 3-phase a-c power of the frequency output by the inverters 4, 4, - - - , with the result that all or some of the motors 11, 12, 21, 22, 31, 32 and 33 generate power, exerting regenerative braking, with the surplus of the generated power stored in the power failure power feeding section 9. Thus, the voltage of the output power from the power failure power feeding section 9 is restored.

Thus, the voltage of the power fed to the motors 11, 12, 21, 22, 31, 32 and 33 via the inverters 4, 4, - - - can be maintained at a stable state even in a power failure, and the rotary press can be decelerated and stopped in a synchronized state under the control by the inverters, 4, 4, - - - .

It can be easily understood that under the control in the event of a power failure by this control system, the rotary press is decelerated and stopped slightly ahead of the decelerating command by the power failure basic speed command signal.

Next, another embodiment of the present invention will be described, referring to the accompanying drawings.

Figure 3:
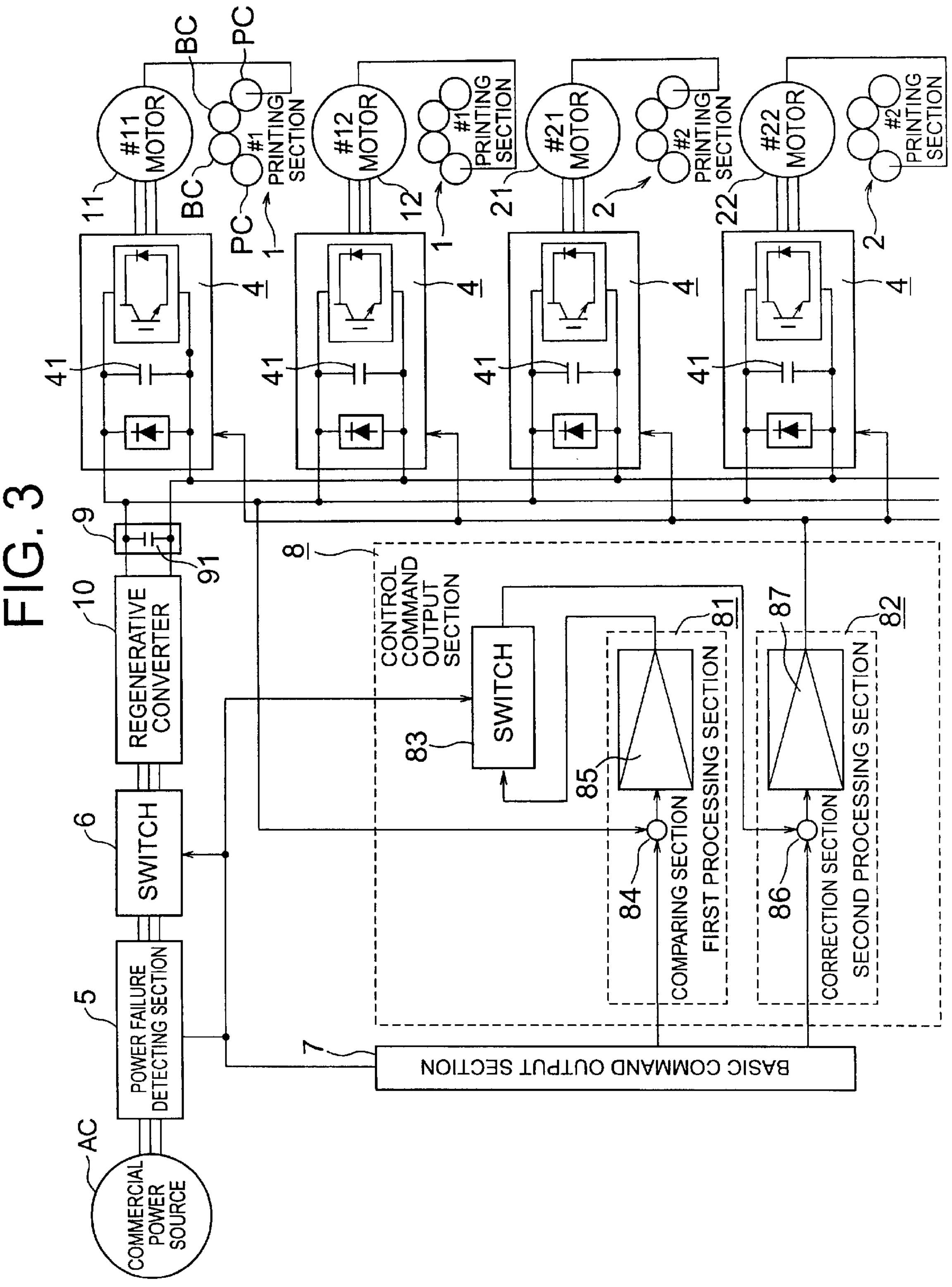
FIG. 3 is a diagram illustrating the partial configuration of another embodiment of the present invention.
Figure 4:
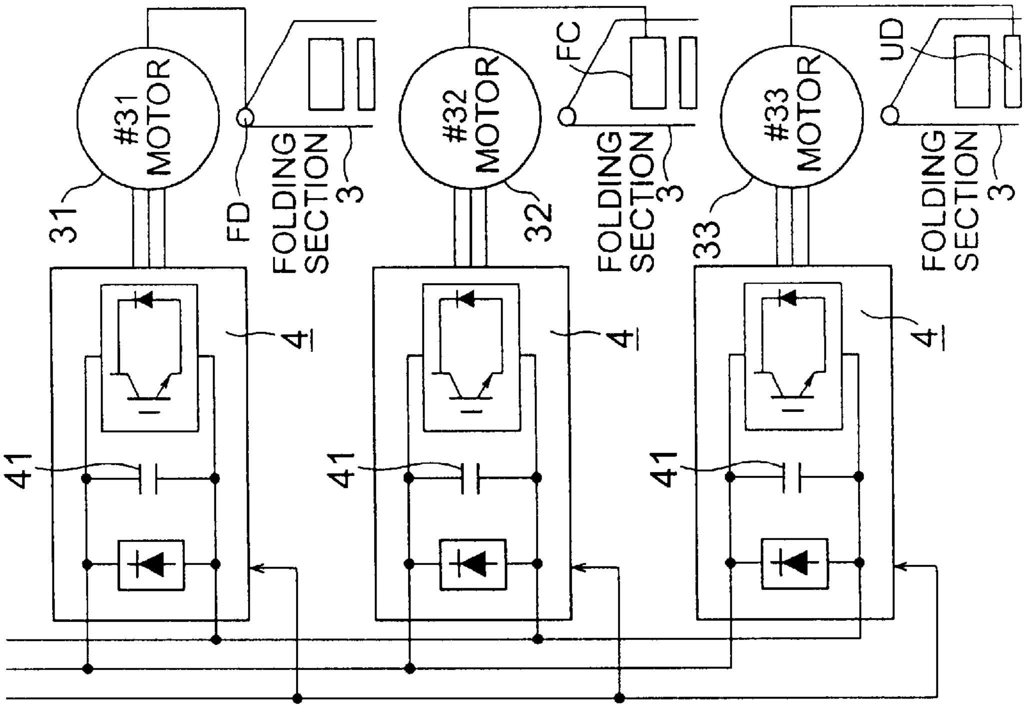
FIG. 4 is a diagram illustrating the partial configuration of another embodiment of the present invention, with the left end thereof connected to the right end of FIG. 3 to constitute the entire configuration.

FIG. 3 is a diagram illustrating the partial configuration of another embodiment of the present invention. FIG. 4 is a diagram illustrating the partial configuration of another embodiment of the present invention, with the left end thereof connected to the right end of FIG. 3 to constitute the entire configuration.

In FIGS. 3 and 4, description will be made on the configuration of a rotary press where two driven components of a #1 printing section are driven by a #11 motor 11 and a #12 motor 12, two driven components of a #2 printing section are driven by a #21 motor 21 and a #22 motor 22, and three driven components of a folding section 3 are driven by a #31 motor 31, a #32 motor 32 and a #33 motor 33, as in the case of FIGS. 1 and 2.

Each of the printing sections 1 and 2 comprises two sets of printing couples as driven components comprising a blanket cylinder BC and a plate cylinder PC; each printing couple individually driven by motors 11 and 12, or 21 and 22, directly or via transmission means (not shown).

The folding section 3 comprises a folding mechanism and an above-former drag roller FD and under-folder drag roller UD, both being driven components each individually driven by motors 31, 32 or 33 directly or via transmission means (not shown).

In the embodiment shown in FIGS. 3 and 4, the motors 11, 12, 21, 22, 31, 32 and 33 are connected to the commercial power source AC via the inverter 4 provided for each of them. Between the commercial power source AC and each inverter 4 provided are the power failure detecting section 5 for detecting a voltage drop in the commercial power source AC from the upstream aide of power feeding and outputting a power failure signal, the switch 6 that turns "OFF" upon receipt of the power failure signal, a regenerative converter 10 for converting a 3-phase a-c power fed from the commercial power source AC into a d-c power, and the large capacity capacitor 91 constituting part of the power failure power feeding section 9, which will be described later.

The inverters, 4, 4, - - - are connected in parallel to the power feeding side ranging from the commercial power source AC to the large capacity capacitor 91, and also connected in parallel to the basic command output section 7 via the control command output section 8, which will be described later, so as to receive the normal operation control speed command signal output by the control command output section 8 on the basis of the normal operation basic speed command signal output by the basic command output section 7, or the power failure control speed command signal output by the control command output section 8 on the basis of the power failure basic speed command signal output by the basic command output section 7.

Furthermore, the inverters 4, 4, - - - are connected in parallel to the built-in capacitors 41, 41, - - - , which are in turn connected in parallel to a capacitor 91 having a capacity far larger than the capacities of the capacitors 41, 41, - - - . This capacitor 91 is a storage section that constitutes a power failure power feeding section 9 for feeding uniform power to the inverters 4, 4, - - - in the event of a power failure.

The basic command output section 7 is connected to the commercial power source AC shown in the figure via another path, or to another commercial power source of a difference system, and at the same time, has an uninterruptible power supply, for example. This uninterruptible power supply is actuated with a detection signal output by a power failure detector incorporated in the uninterruptible power supply. As a result, the basic command output section 7 can maintain its function of outputting basic command signals for a predetermined length of time even in the event of a power failure. The basic command output section 7 can switch over signals output by itself upon receipt of a detection signal output by the power failure detector of the uninterruptible power supply, or a power failure signal output by the aforementioned power failure detecting section 5.

That is, when the commercial power source AC is in normal state, the basic command output section 7 outputs a normal operation basic speed command signal for instructing the rotary press to execute an operation in accordance with a start, acceleration/deceleration, constant speed operation or stop signal given by the manual operation of the operating switch of the rotary press, or in accordance with a sequential signal involving start, acceleration/deceleration, constant speed operation or stop output by this manual operation.

In case the commercial power source AC fails, the uninterruptible power supply of the basic command output section 7 is actuated to maintain the operating state thereof, and the basic command output section 7 outputs a power failure basic speed command signal for instructing the rotary press to stop its operation after a predetermined deceleration process, in place of the normal basic speed command signal, and outputs a power failure basic voltage signal for instructing the rotary press to keep the voltage fed to the inverters 4, 4, - - - at a constant level.

The control command output section 8 is connected to the commercial power source AC shown in the figure via another path, or to another commercial power source of a different system, and has an interruptible power supply, as in the case of the aforementioned basic command output section 7. The uninterruptible power supply is actuated with a detection signal from a power failure detector incorporated in the uninterruptible power supply. As a result, the control command output section 8 can maintain its function of outputting control command signals for a predetermined length of time even in the event of a power failure.

The control command output section 8 generates and outputs a normal operation control speed command signal on the basis of the aforementioned normal operation basic speed command signal, and also generates and outputs a power failure control speed command signal on the basis of the aforementioned power failure basic speed command signal.

That, is, the control command output section 8 has a first processing section 81 for generating a correction signal in accordance with a change in the voltage of the power fed to the inverters 4, 4, - - - , and a second processing section 82 for correcting the basic speed command signal to an appropriate control speed command signal on the basis of the correction signal and outputting the corrected control speed command signal. A switch 83 that is normally in "OFF" state and turns "ON" upon receipt of a power failure signal output by the aforementioned power failure detecting section 5 is provided between the first and second processing sections 81 and 82.

The first processing section 81 comprises a comparing section 84 for comparing a detection signal of the voltage of the power fed to the inverters 4, 4, - - - with the power failure basic voltage command signal output by the basic command output section 7, and a correction signal output section 85 for outputting a correction signal corrected on the basis of the comparison results. The second processing section 82 comprises a correction section 86 for correcting the basic speed command signal output by the basic command output section 8 with the aforementioned correction signal, and a control signal output section 87 for outputting a control speed command signal on the basis of the correction results.

In the meantime, it is apparent from the foregoing description that the first processing section 81 generates a correction signal, which is input into the correcting section 86 of the second processing section 82 only in a power failure when the switch 83 is turned "ON." For this reason, the power failure basic speed command signal is corrected with a correction signal in the second processing section 82, and the control signal output section 87 outputs a power failure control speed command signal on the basis of it.

Note that whereas the normal operation basic speed command signal goes through the correcting section 86 of the second processing section 82, the normal operation basic speed command signal is not corrected during normal operation where no correction signal is input into the correcting section 86. The control signal output section 87 therefore outputs the normal operation control speed command signal on the basis of the normal operation basic speed command signal.

In normal operation, that is, when the commercial power source AC is in its normal state, the basic command output section 7, upon receipt of an operating signal given by the manual operation of the operating switch of the rotary press, outputs a normal operation basic speed command signal for instructing an operation in accordance with the operating signal. This normal operation basic speed command signal goes through the correcting section 86 of the second processing section 82 and the control signal output section 87, and is output as a normal operation control speed command signal from the control command output section 87. The normal operation control speed command signal output by the control signal output section 87 is input into the inverters 4, 4, - - - provided for each of the motors 11, 12, 21, 22, 31, 32 and 33.

The inverters 4, 4, - - - to which the normal operation control speed command signal is input receive the d-c power obtained by converting the 3-phase a-c power from the commercial power source AC in a regenerative converter 10, process the d-c power in accordance with the normal operation control speed command signal through a processing predetermined for each inverter 4, convert it into a 3-phase a-c power of a frequency to cause the motor 11, 12, 21, 22, 31, 32 or 33 each inverter 4 controls to rotate at an operating speed corresponding to the instruction of the aforementioned normal operation control speed command signal, and output the 3-phase a-c power to cause the motor 11, 12, 21, 22, 31, 32 or 33 each inverter 4 controls to rotate in accordance with the normal operation control speed command signal on the basis of the normal operation basic speed command signal. With this, the rotary press is operated in accordance with the operating signal Needless to say, synchronous control is accomplished by providing a known synchronous control section (not shown), outputting a basic phase command signal from the basic command output section 7, feeding back the rotational phase of the motors 11, 12, 21, 22, 31, 32, and 33 with a rotary encoder, for example, and comparing the rotation phase of the motors 11, 12, 21, 22, 31, 32 and 33 with the phase instructed by the basic phase command signal, and matching the rotational phases of the driven components on the basis of the processing results.

Since synchronous control is not necessarily required for the control of rotary press in a power failure that is a feature of the present invention, and it is not directly related to the present invention, description of the synchronous control has been omitted. Needless to say, synchronous control can be carried out even in the control of rotary press in a power failure.

In this normal operating state, if the voltage of the commercial power source AC drops due to a power failure, the power failure detecting section 5 detects it and outputs a power failure signal. This power failure signal is input into the switch 6 provided between the power failure detecting section 5 and the regenerative converter 10, the basic command output section 7 and the switch 83 of the control command output section 8.

As the power failure temporarily interrupts power feeding to the motors 11, 12, 21, 22, 31, 32 and 33 via the regenerative converter 10 and the inverters 4, 4, - - - , the motors 11, 12, 21, 22, 31, 32 and 33 begin inertial rotation, together with the driven components thereof.

In the meantime, the switch 6 into which the power failure signal is input is turned to the "OFF" state, breaking the connection between the commercial power source AC and the inverters 4, 4, - - - on the upstream side of the regenerative converter 10. As the connection to the commercial power source AC is disconnected, the d-c power that had been obtained by converting the power from the commercial power source AC with the regenerative capacitor 10 during normal operation and stored in the power failure power feeding section 9 comprising the capacitors 41, 41, - - - of the inverters 4, 4 - - - , and the large-capacity capacitor 91 is uniformly supplied to the inverters 4, 4, - - - . In the power failure power feeding section 9 stored is the power generated by the inertial rotation of the motors 11, 12, 21, 22, 31, 32 and 33.

After this, the basic command output section 7, the control command output section 8, the first processing section 81, the second processing section 82, and the inverters 4, 4, - - - operate in the same manner as in the case of FIGS. 1 and 2.

In the embodiment shown in FIGS. 3 and 4, no small amount of the generated power and the power stored in the power failure power feeding section 9 is consumed in the regenerative converter 10. As a result, the motors 11, 12, 21, 22, 31, and 33 are regeneratively braked. The surplus of the generated power is stored in the power failure power feeding section 9.

As is apparent from the foregoing description, referring to the accompanying drawings, the embodiment shown in FIGS. 3 and 4 has the regenerative converter 10 added to the power feeding path ranging from the commercial power source AC to the inverters 4, 4, - - - in the embodiment shown in FIGS. 1 and 2.

The configuration having the regenerative converter 10 in the embodiment shown in FIGS. 3 and 4 makes it possible to prevent the generation of high harmonics, and accordingly eliminate the malfunction of equipment caused by the high harmonics and the harmful effects of the high harmonics on the human body. The regenerative action of the regenerative converter 10 leads to highly efficient power consumption and accordingly high energy conservation effects.

As described above, the present invention makes it possible to decelerate and stop the rotary press at least in the synchronized state, even in case the commercial power source fails during the printing operation of the rotary press, by making full use of the power generated by the motors. This helps prevent uneven tension from exerting on the continuous paper web traveling in the rotary press, thereby preventing the breakage of the web or the sticking of the web to the rotary parts. Thus, the rotary press can be resumed operation immediately after the restoration of the power source.

What is claimed is:

1. A rotary press control apparatus capable of controlling, in the event of a power failure, the operation of a rotary press comprising at least one unit each of printing and folding sections; each of the printing and folding sections having at least one electric motor so as to be driven individually, the rotary press operated in a synchronized manner by the motors; the apparatus comprising:

an inverter provided on each motor for controlling the rotation of the motor;

a basic command output section that can be operated even in a power failure for outputting a normal operation basic speed command signal during normal operation, a power failure basic speed command signal and a power failure basic voltage command signal for specifying the voltage of power fed to each inverter in the event of a power failure;

a power failure detecting section for detecting a power failure and outputting a power failure signal;

a power failure power feeding section for storing the power generated by the inertial rotation of the motors during a power failure and feeding power to each of the inverters; and a control command output section that can be operated even in a power failure for outputting a normal operation control speed command signal in accordance with the normal operation basic speed command signal during normal operation, and in the event of a power failure, comparing the power failure basic voltage command signal with an output voltage detection signal of the power failure power feeding section, and generating a power failure control speed command signal for output by correcting the power failure basic speed command signal in accordance with the comparison results, so that the rotary press can be decelerated and stopped at least in a synchronized state in the event of a power failure while stabilizing the voltage of the power fed to each of the inverters from the power failure power feeding section to a voltage level instructed by the power failure basic voltage command signal.

2. A rotary press control method capable of controlling, in the event of a power failure, the operation of a rotary press comprising at least one unit each of printing and folding sections; each of the printing and folding sections having at least one electric motor so as to be driven individually, and an inverter provided on each motor for controlling the rotation of the motor; the rotary press operated in a synchronized manner by the motors, the method comprising:

detecting a power failure and outputting a power failure signal;

outputting a normal operation basic speed command signal during normal operation, a power failure basic speed command signal and a power failure basic voltage command signal for specifying the voltage of power fed to each inverter in the event of a detected power failure;

outputting a normal operation control speed command signal in accordance with the normal operation basic speed command signal during normal operation, and in the event of a power failure comparing the power failure basic voltage command signal with an output voltage detection signal of the power failure power feeding process, and generating a power failure control speed command signal for output by correcting the power failure basic speed command signal in accordance with the comparison results, storing the power generated by the inertial rotation of the motors during a power failure and feeding power to each of the inverters, so that the rotary press can be decelerated and stopped at least in a synchronized state in the event of a power failure while stabilizing the voltage of the power fed to each of the inverters from the power failure power feeding process to a voltage level instructed by the power failure basic voltage command signal.

* * * * *